US012706950B2

(12) United States Patent
Hendley

(10) Patent No.: US 12,706,950 B2
(45) Date of Patent: Aug. 11, 2026

(54) SENSING A PRESENCE OF INTRUSTION OF DIGITAL COMMUNICATIONS FOR PHISHING ATTEMPTS

(71) Applicant: Truist Bank, Charlotte, NC (US)

(72) Inventor: William Vance Hendley, Lake Wylie, SC (US)

(73) Assignee: TRUIST BANK, Charlotte, NC (US)

( * ) Notice: Subject to any disclaimer, the term of this patent is extended or adjusted under 35 U.S.C. 154(b) by 14 days.

(21) Appl. No.: 18/829,653

(22) Filed: Sep. 10, 2024

(65) Prior Publication Data

US 2026/0075089 A1 Mar. 12, 2026

(51) Int. Cl.

| | |
|---|---|
| ***H04L 9/40*** | (2022.01) |
| ***G06F 3/04842*** | (2022.01) |
| ***H04L 51/214*** | (2022.01) |

(52) U.S. Cl.

CPC ...... *H04L 63/1483* (2013.01); *G06F 3/04842* (2013.01); *H04L 51/214* (2022.05)

(58) Field of Classification Search

CPC ............... H04L 63/1483; H04L 51/214; G06F 3/04842

See application file for complete search history.

(56) References Cited

U.S. PATENT DOCUMENTS

2006/0168066 A1* 7/2006 Helsper ............... H04L 63/1466 709/206
2009/0248623 A1* 10/2009 Adelman ............ H04L 65/1079
2021/0176272 A1* 6/2021 Maha ...................... H04W 4/12
2023/0344869 A1* 10/2023 Jakobsson ........... H04L 63/1483

* cited by examiner

*Primary Examiner* — Azizul Choudhury

(74) *Attorney, Agent, or Firm* — Michael A. Springs, Esq.; Shumaker, Loop & Kendrick, LLP; Patrick B. Horne

(57) ABSTRACT

A system and method sense a presence of intrusion of digital communications for phishing attempts including: a processor operatively connected to a memory device and a non-transitory storage device, wherein the processor executes computer-readable instructions of a digital communication application; a computer device with a display communicating with the processor to display digital communications addressed to a receiving communication address; and wherein, upon execution of the computer-readable instructions, the computing system performs steps comprising: in response to selection of the digital communication displayed at the computer device via the computer device, displaying either a Check Phishing button or a submenu listing a Check Phishing action at the computer device; and in response to selection of the button or selection of the action via the computer device, the processor executes computer-readable instructions of a check phishing application stored in the storage device to authenticate the from address of the digital communication.

14 Claims, 3 Drawing Sheets

SENSING A PRESENCE OF INTRUSTION OF DIGITAL COMMUNICATIONS FOR PHISHING ATTEMPTS

TECHNICAL FIELD

The present disclosure relates to cybersecurity for digital communications. More particularly, the present disclosure relates to a system and a method for automatically sensing email phishing communications.

BACKGROUND

The email systems of businesses are under constant attack from cybercriminals, individuals and groups, attempting to trick employees into providing sensitive information and/or login credentials. Known as "phishing", these attacks have become increasingly sophisticated and often transparently mirror the site being targeted, allowing the attacker to observe while the employee navigates the site, and transverse any additional security boundaries with the employee. Common targets include financial institutions, email and cloud productivity providers, and streaming services. The stolen information or access may be used to steal money, install malware, or spear phish others within the target organization.

Spear phishing is a targeted phishing attack that uses personalized messaging, especially emails, to trick a specific individual or organization into believing they are legitimate. It often utilizes personal information about the target to increase the chances of success. These attacks often target executives or those in financial departments with access to sensitive financial data and services. Banks, accountancy and audit firms are particularly vulnerable to spear phishing due to the value of the information their employees have access to.

Email spoofing is a practice used in scams and phishing attacks to deceive people into believing the communication came from a known or trusted source. Cybercriminals use this technique hoping that the recipient will not notice and engage with the communication as if it's a legitimate email. Several different types of email spoofing are used.

Display name spoofing is an example of spoofing email headers where only the sender's display name is falsified. With this type of email spoofing, the email address itself will not match the display name attached to the email. For example, the employee may get an email that shows it is coming from his/her boss, but after opening the communication, the sender's email address does not match the email address of the boss. This is possible if a cybercriminal creates a new email address under the boss's name. Because the email itself is legitimate, this type of spoofed email might bypass any spam filters, therefore easily making it into the employee's inbox.

Legitimate domain spoofing is a much more believable email spoofing example. In this case, both the display name and the sender's address will be fake. Cybercriminals can do this by taking advantage of Simple Mail Transfer Protocol (SMTP), which is an email protocol used for sending communications. During normal email communications, your email client (Gmail, Outlook, etc.) will automatically enter the sender's address whenever an email is sent. In the event of email spoofing, the attacker can manipulate this information, making it seem as if the email is coming from someone else. Because SMTP does not provide a way to authenticate email addresses, the scammer can manually change the "To," "From," and "Reply To" fields when sending spoofing emails.

Another example of email spoofing is the use of look-alike domains. An example of a spoofed domain is "amaz0n.com". In this specific scenario, the spoofer created a domain attempting to impersonate "amazon.com". At first glance, you may not notice that the "o" has been replaced with a "0." This technique can be effective if the employee doesn't pay close attention to the spoofed email header, especially if the contents of the email look legitimate. Because of this, it's important to always pay close attention to the sender's details before engaging with an email.

While most popular email providers have put additional security frameworks in place to help detect spoofed emails, the employee faced with a suspicious email either must delete the email or report it as a suspected spam or phishing communication. When reporting an email to an internal email review team of the IT department of the business, the email is sent to the email review team inbox and is deleted or blocked from the employee's inbox. If the email from address of the communication is found to be valid, it is returned to or unblocked from the employee's inbox resulting in a delay in addressing the contents of the communication by the employee, as well as wasting the time of the email review team. Thus, improvements are needed to enable employees to perform an initial review of suspicious emails for authenticity thereby eliminating the delay and wasted time caused by the review of a valid email by the email review team.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

According to at least one embodiment, a computing system for sensing a presence of intrusion of digital communications for phishing attempts comprises: a processor operatively connected to a memory device and to a non-transitory storage device, wherein the processor executes computer-readable instructions of a digital communication application; a computer device with a display, the computer device communicating with the processor to display digital communications addressed to a receiving communication address; and wherein, upon execution of the computer-readable instructions, the computing system performs the steps of reviewing the communication. The steps include: upon receiving a digital communication addressed to the receiving communication address, displaying the digital communication at the computer device; in response to selection of the digital communication displayed at the computer device via the computer device, displaying either a Check Phishing button or a submenu listing a Check Phishing action at the computer device; in response to selection of the button or selection of the action via the computer device, the processor executes computer-readable instructions of a check phishing application stored in the storage device. The check phishing application performs the steps of: comparing a displayed from address of the digital communication with a plurality of valid communication addresses in a database stored in the storage device; when the from address corresponds to one of the valid communication addresses, displaying a first popup window at the computer device indicating that the from address is valid; and when the from address does not correspond to any of the valid communication addresses, displaying a second popup window at the computer device indicating that the from address is invalid.

The computing system steps include removing the digital communication from the display when the from address does not correspond to any of the valid communication addresses and forwarding the digital communication to a review team communication address.

The computing system steps include comparing the from address with a source address included in a header of the digital communication, when the from address corresponds to the source address and the source address corresponds to one of the valid communication addresses in the database, displaying the first popup window at the computer device indicating that the from address is valid, and when the from address does not correspond to the source address and the source address does not correspond to any of the valid communication addresses in the database, displaying the second popup window at the computer device indicating that the from address is invalid. The computing system removes the digital communication from the display when the from address does not correspond to the source address and the source address does not correspond to any of the valid communication addresses and forwards the digital communication to a review team communication address.

The valid communication addresses in the database include employee communication addresses, client communication addresses, or vendor communication addresses.

The computing system displays the submenu listing a Check Phishing action at the computer device includes displaying a menu listing a Report Spam action at the computer device and displaying the submenu in response to a selection of the Report Spam action from the menu.

In yet another embodiment, to which the above examples also apply as well, a method for sensing a presence of intrusion of digital communications for phishing attempts includes the steps of: providing a processor operatively connected to a memory device and to a non-transitory storage device, wherein the processor executes computer-readable instructions of a digital communication application; providing a computer device with a display, the computer device communicating with the processor to display digital communications addressed to a receiving communication address; storing in the storage device a check phishing application and a plurality of valid communication addresses in a database; and wherein, upon execution of the computer-readable instructions, the processor performs further steps.

The further steps comprise: upon receiving a digital communication addressed to the receiving communication address, displaying the digital communication at the computer device; in response to selection of the digital communication displayed at the computer device via the computer device, displaying either a Check Phishing button or a submenu listing a Check Phishing action at the computer device; in response to selection of the button or selection of the action via the computer device, the processor executes computer-readable instructions of the check phishing application.

The check phishing application includes the steps of: comparing a displayed from address of the digital communication with the plurality of valid communication addresses in the database; when the from address corresponds to one of the valid communication addresses, displaying a first popup window at the computer device indicating that the from address is valid; and when the from address does not correspond to any of the valid communication addresses, displaying a second popup window at the computer device indicating that the from address is invalid.

The method steps include removing the digital communication from the display when the from address does not correspond to any of the valid communication addresses and forwarding the digital communication to a review team communication address.

The method steps include comparing the from address with a source address included in a header of the digital communication, when the from address corresponds to the source address and the source address corresponds to one of the valid communication addresses in the database, displaying the first popup window at the computer device indicating that the from address is valid, and when the from address does not correspond to the source address and the source address does not correspond to any of the valid communication addresses in the database, displaying the second popup window at the computer device indicating that the from address is invalid.

The method steps include removing the digital communication from the display when the from address does not correspond to the source address and the source address does not correspond to any of the valid communication addresses and forwarding the digital communication to a review team communication address.

The valid communication addresses in the database include employee communication addresses, client communication addresses, or vendor communication addresses.

The method steps include wherein displaying the submenu listing a Check Phishing action at the computer device includes displaying a menu listing a Report Spam action at the computer device and displaying the submenu in response to a selection of the Report Spam action from the menu.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
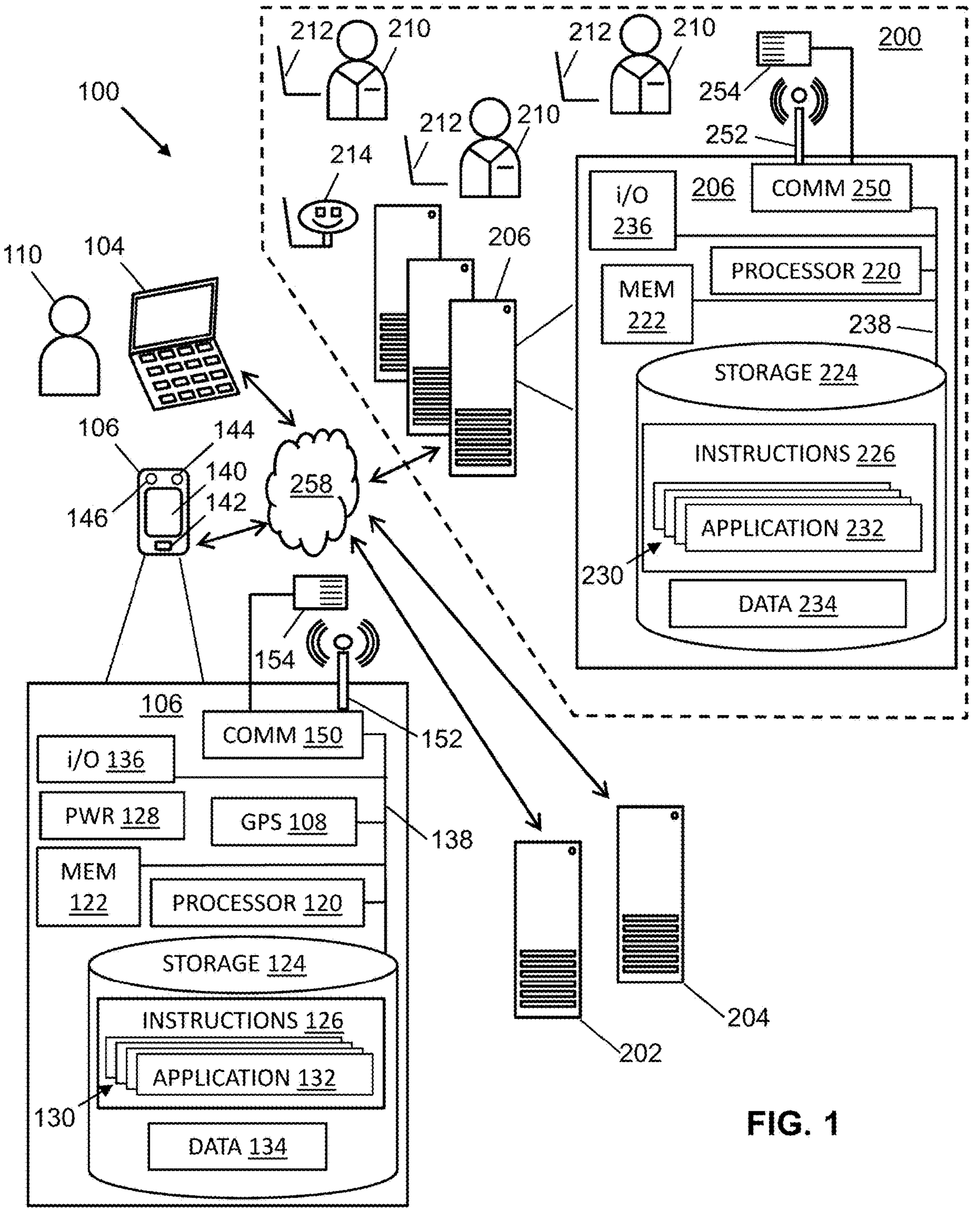
FIG. 1 illustrates an enterprise system and environment thereof, in accordance with various embodiments of the invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to illustrations and/or block diagrams of systems and apparatuses (the term "apparatus" includes systems and computer program products), will be understood such that each function described or implied with reference to the illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts described, illustrated, and/or implied.

These computer program instructions may also be stored in a computer-readable memory that can direct a computer or other programmable data processing apparatus to function in a particular manner, such that the instructions stored in the computer readable memory produce an article of manufacture including instructions, which implement the function/act described, illustrated, and/or implied.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein. Where functions of hardware and software are described herein, related methods are detailed therewith, such that methods are disclosed as well.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of “service(s)” or “product(s)” thus relates to either or both in these descriptions. With regard, for example, to online information and financial services, “service” and “product” are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device 106 during transactions and also configured to interact with the enterprise system 200 in back-end transactions clearing processes.

In certain embodiments, one or more of the systems and devices, such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Figure 2:
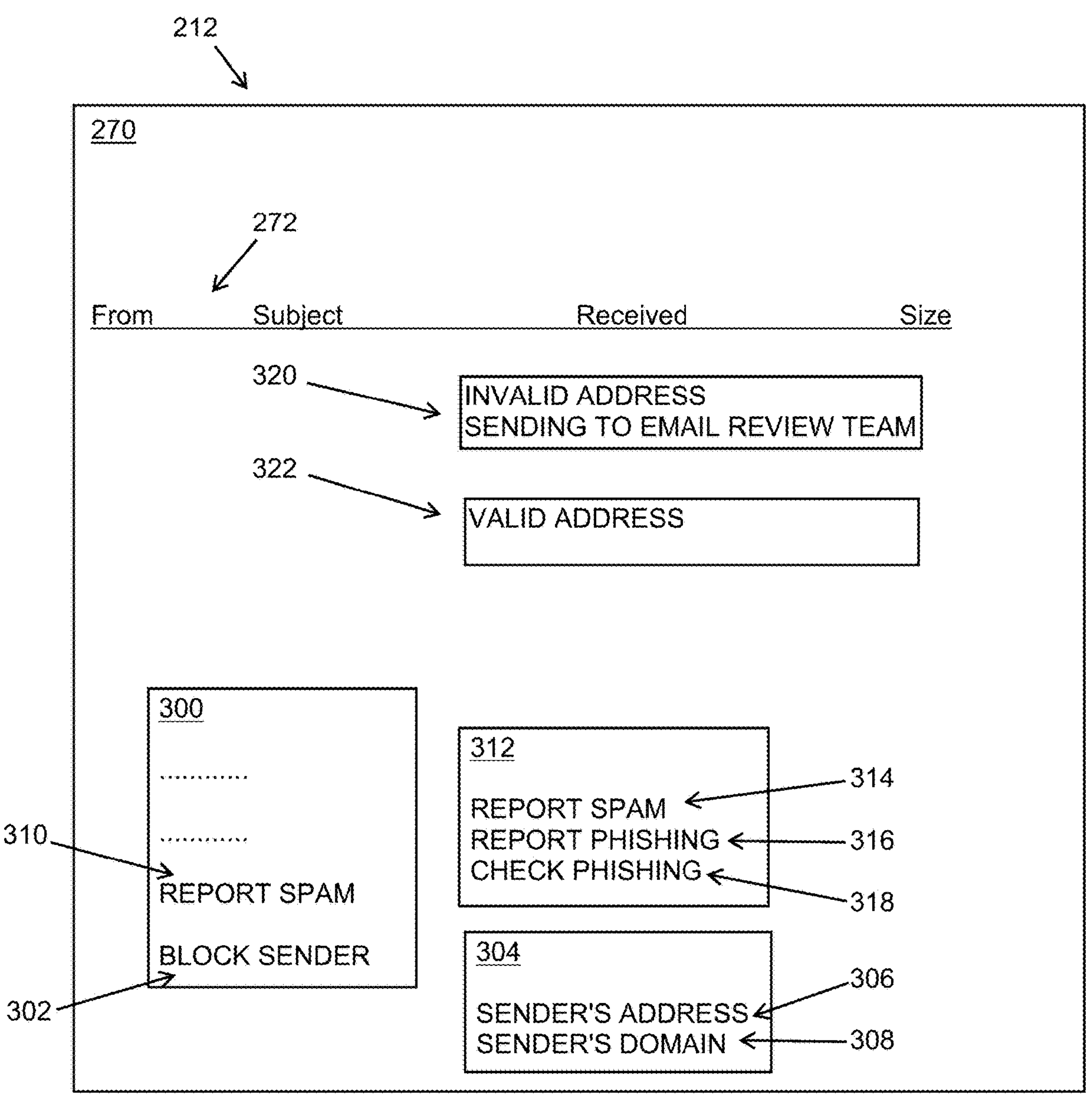
FIG. 2 shows a portion of an email program dropdown menu generated by the invention.

In non-limiting examples, the system 200 of FIG. 1 may be that of an entity that provides financial services and operates as a financial institution. The human agents 210 can be employees of the financial institution. The agent devices 212 can be computer devices used by the employees to perform work for the financial institution including communicating with other employees, clients and vendors through email communications using a digital communication or messaging application. FIG. 2 shows a portion of a version of a dropdown menu 300 that is displayed by right clicking on a selected email communication in an inbox displayed by one of the computer devices 212 during operation of a digital communication or messaging application by the system 200. The dropdown menu 300 lists actions that can be initiated by left clicking on the selection action in the list. For example, if the employee 210 decides that he/she no longer desires to receive communications from the source of a selected email, left clicking on the Block Sender action 302 displays a dropdown submenu 304. The submenu 304 includes a Sender's Address action 306 and a Sender's Domain action 308. Left clicking on one of the actions 306 and 308 causes the blockage of subsequent emails from the sender's address and the sender's domain respectively.

Above the Block Sender action 302 in the menu 300 is a Report Spam action 310. Left clicking on the Report Spam action 310 displays a dropdown submenu 312. The submenu 312 includes a Report Spam action 314 and a Report Phishing action 316. Left clicking on the action 314 causes the selected email to be sent to the provider of the email software application and/or to an email review team in the IT department of the financial institution. The email is deleted from the inbox and the address is added to a spam email list used to screen incoming emails. Left clicking on the action 316 causes the selected email to be sent to the provider of the email software application and/or to the email review team. The email is deleted or blocked from the inbox and the from address is added to a phishing email list used to screen incoming emails.

Figure 3:
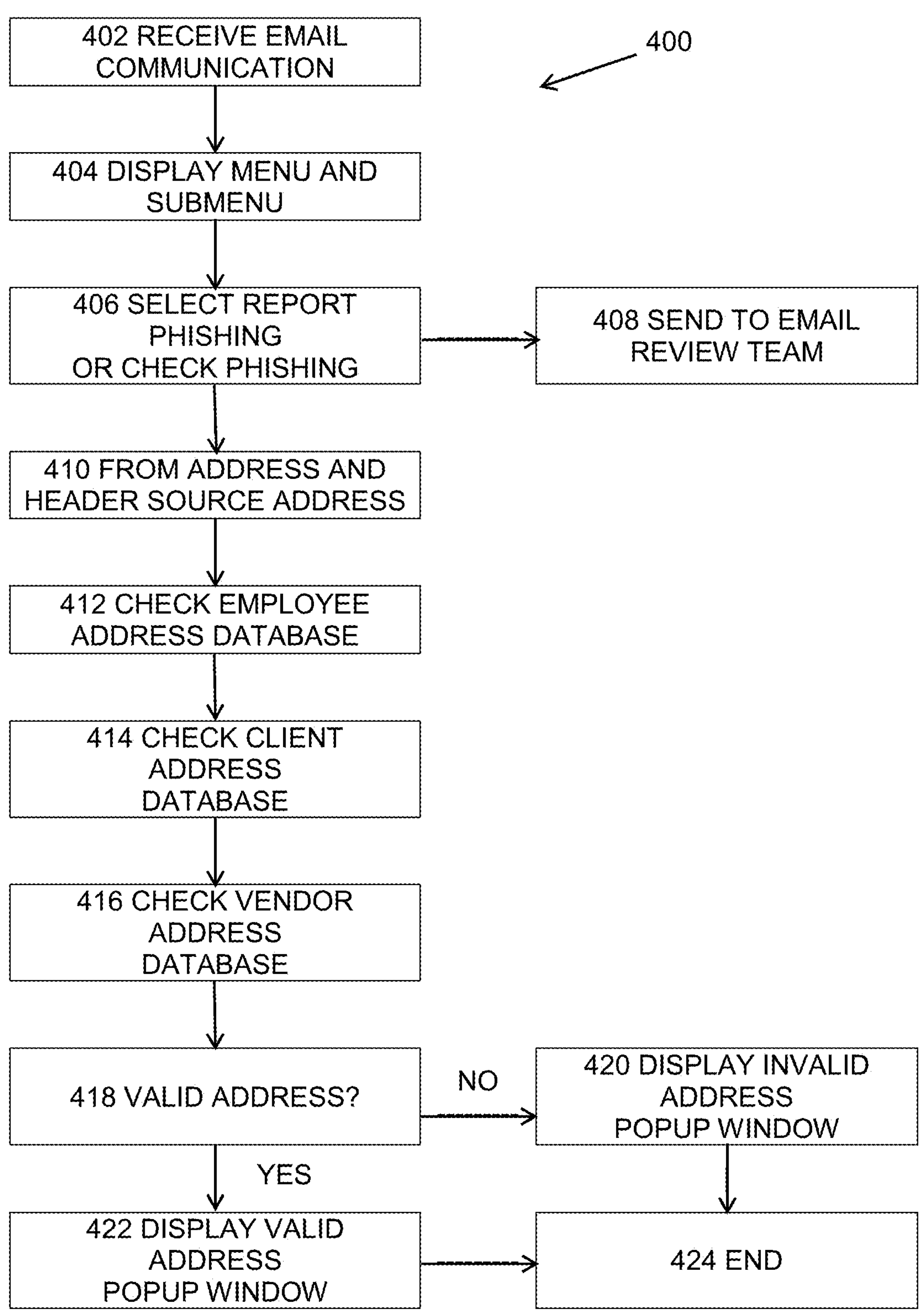
FIG. 3 is a flow diagram representing a method, according to at least one embodiment of the invention, of reviewing digital communications for authenticity.

According to the invention, a Check Phishing action 318 is added to the submenu 312. In the alternative, the action 318 could be displayed as a separate button. Left clicking on the action 318 causes a check phishing application to be executed to perform the method 400 as shown in FIG. 3. The check phishing application causes steps to be performed to inspect the email header and also compare the email address of the sender with one or more databases of valid email addresses. This procedure avoids the delay and lost time associated with having the email review team review an email from a valid email address and return the email to the employee that reported it.

FIG. 3 is a flow diagram representing a method 400, according to at least one embodiment of the invention, of reviewing digital communications for authenticity. An employee 210 is operating a computer device 212 displaying screens generated by an email application such as is included in Microsoft Outlook. In a step 402, an email communication is received in the inbox displayed by the computer device 212. If the employee suspects that the email might be a phishing communication, the employee right clicks on the selected email and the computer device 212 displays the dropdown menu 300 shown in FIG. 2 according to a step 404. The employee left clicks the Report Spam action 310 and the computer device displays the dropdown submenu 312 in the step 404.

In a step 406, if the employee selects the Report Phishing action 316, the application performs the method to send the selected email to the email review team in a step 408 and waits for the email to be returned to or unblocked from the inbox if the email is determined to be from a valid address. In the step 406, if the employee selects the Check Phishing action 318, the method begins a process of checking the email header and the email from address. Emails contain three main elements: the communication body, the envelope, and the communication header. The communication header is a log of an email's technical details that both the sender and recipient can see, though it can't be as easily viewed as the email body. The header contains details regarding the sender, the receiver, and the communication including any email addresses that are involved in the conversation, the servers the email passed through while being sent, and more.

In a step 410, the from address in the communication header is compared with the email source address. In the following address comparison steps, if the from address is the same as the source address either address can be used as the email address to compare to the database addresses, and if they are different the source address is used as the email address for the comparison. In a step 412, the email address is compared with the financial institution employee email addresses stored in a secure database. In a step 414, the email address is compared with the financial institution client email addresses stored in a secure database. In a step 416, the email address is compared with the financial institution vendor email addresses stored in a secure database.

Based upon checking the communication header and the email databases, it is determined whether the from address is valid or invalid in a step 418. An invalid address is determined by a communication header mismatch between "from" and "source" and/or no match in the databases. The method displays a popup window on the computer device 212 in a step 420 stating that the email address is invalid and sends the selected email to the communication address of the email review team for review. A valid address is determined by a communication header match combined with an address match in one of the databases. The method 400 then displays a popup window on the computer device 212 in a step 422 stating that the email address is valid and retains or unblocks the selected email in the employee inbox. The steps 420 and 422 lead to the termination of the check phishing application in a step 424.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A computing system for sensing a presence of intrusion of digital communications for phishing attempts, the computing system being included in an enterprise system maintained by an enterprise, the computing system comprising:

a processor, a memory device, and a non-transitory storage device internal to the enterprise system, the processor being operatively connected to the memory device and to the storage device, wherein the processor executes computer-readable instructions of a digital communication application;

a computer device with a display, the computer device communicating with the processor to display digital communications processed by the digital communication application and addressed to a receiving communication address associated with an employee of the enterprise; and wherein, upon execution of the computer-readable instructions by the processor, the computing system performs steps comprising:

upon receiving a digital communication addressed to the receiving communication address, displaying the digital communication at the computer device;

in response to selection of the digital communication displayed at the computer device via the computer device, displaying either a Check Phishing button or a submenu listing a Check Phishing action at the computer device display;

in response to selection of the button or selection of the action via the computer device, the processor executes computer-readable instructions of a check phishing application stored in the storage device, the check phishing application, without transmitting the digital communication to an external service, performing steps of:

comparing a displayed from address of the digital communication with a plurality of valid communication addresses in a database stored in the storage device and maintained by the enterprise, the valid communication addresses including employee communication addresses, client communication addresses, and vendor communication addresses;

when the from address corresponds to one of the valid communication addresses, displaying a first popup window at the computer device display indicating that the from address is valid; and when the from address does not correspond to any of the valid communication addresses, displaying a second popup window at the computer device display indicating that the from address is invalid.

2. The computing system according to claim 1 including removing the digital communication from the display when the from address does not correspond to any of the valid communication addresses.

3. The computing system according to claim 2 including forwarding the digital communication to a review team communication address.

4. The computing system according to claim 1 including comparing the from address with a source address included in a header of the digital communication, when the from address corresponds to the source address and the source address corresponds to one of the valid communication addresses in the database, displaying the first popup window at the computer device indicating that the from address is valid, and when the from address does not correspond to the source address and the source address does not correspond to any of the valid communication addresses in the database, displaying the second popup window at the computer device indicating that the from address is invalid.

5. The computing system according to claim 4 including removing the digital communication from the display when the from address does not correspond to the source address and the source address does not correspond to any of the valid communication addresses.

6. The computing system according to claim 5 including forwarding the digital communication to a review team communication address.

7. The computing system according to claim 1 wherein the displaying the submenu listing a Check Phishing action at the computer device includes displaying a menu listing a Report Spam action at the computer device and displaying the submenu in response to a selection of the Report Spam action from the menu.

8. A method for performing an automated review of digital communications for phishing attempts in a computing system included in an enterprise system maintained an enterprise, the method comprising steps of:

providing a processor operatively connected to a memory device and to a non-transitory storage device in the computing system, wherein the processor executes computer-readable instructions of a digital communication application;

providing a computer device with a display, the computer device communicating with the processor to display digital communications processed by the digital communication application and addressed to a receiving communication address associated with an employee of the enterprise;

storing in the storage device a check phishing application and a plurality of valid communication addresses in a database maintained by the enterprise, the valid communication addresses including employee communication addresses, client communication addresses, and vendor communication addresses; and wherein, upon execution of the computer-readable instructions, the computing system performs steps comprising:

upon receiving a digital communication addressed to the receiving communication address, displaying the digital communication at the computer device display;

in response to selection of the digital communication displayed at the computer device via the computer device, displaying either a Check Phishing button or a submenu listing a Check Phishing action at the computer device;

in response to selection of the button or selection of the action via the computer device, the processor executes computer-readable instructions of the check phishing application, without transmitting the digital communication to an external service, thereby performing steps of:

comparing a displayed from address of the digital communication with the plurality of valid communication addresses in the database;

when the from address corresponds to one of the valid communication addresses, displaying a first popup window at the computer device display indicating that the from address is valid; and when the from address does not correspond to any of the valid communication addresses, displaying a second popup window at the computer device display indicating that the from address is invalid.

9. The method according to claim 8 including removing the digital communication from the display when the from address does not correspond to any of the valid communication addresses.

10. The method according to claim 9 including forwarding the digital communication to a review team communication address.

11. The method according to claim 8 including comparing the from address with a source address included in a header of the digital communication, when the from address corresponds to the source address and the source address corresponds to one of the valid communication addresses in the database, displaying the first popup window at the computer device indicating that the from address is valid, and when the from address does not correspond to the source address and the source address does not correspond to any of the valid communication addresses in the database, displaying the second popup window at the computer device indicating that the from address is invalid.

12. The method according to claim 11 including removing the digital communication from the display when the from address does not correspond to the source address and the source address does not correspond to any of the valid communication addresses.

13. The method according to claim 12 including forwarding the digital communication to a review team communication address.

14. The method according to claim 8 wherein the displaying the submenu listing a Check Phishing action at the computer device includes displaying a menu listing a Report Spam action at the computer device and displaying the submenu in response to a selection of the Report Spam action from the menu.

* * * * *